United States Patent [19]
Stidd

[11] Patent Number: 5,171,063
[45] Date of Patent: Dec. 15, 1992

[54] HELM CHAIR

[76] Inventor: Robert Stidd, 87 Hewitt Blvd., Center Moriches, N.Y. 11934

[21] Appl. No.: 706,634

[22] Filed: May 29, 1991

[51] Int. Cl.⁵ .............................................. B60N 2/02
[52] U.S. Cl. ................................. 297/344; 297/355; 297/DIG. 1; 297/417
[58] Field of Search ................ 297/337, 355, DIG. 1, 297/460, 458, 459, 217, 417, 374, 411, 344, 354

[56] References Cited

U.S. PATENT DOCUMENTS

| | | | |
|---|---|---|---|
| 483,265 | 9/1892 | Schindler | 297/337 X |
| 1,201,844 | 10/1916 | Margolyes | 297/354 X |
| 2,446,185 | 8/1948 | Masucci et al. | 297/337 |
| 2,609,034 | 9/1952 | Barecki | 297/344 X |
| 3,245,720 | 4/1966 | Wenger | 297/423 |
| 3,441,313 | 4/1969 | Persson | 297/374 |
| 3,542,326 | 11/1970 | Reapsummer | 297/344 X |
| 3,634,925 | 1/1972 | Van Loo | 297/411 X |
| 3,773,382 | 11/1973 | Coursault et al. | 297/423 X |
| 3,851,916 | 12/1974 | Quartullo | 297/217 X |
| 3,886,611 | 6/1975 | Lammy et al. | 297/417 X |
| 4,019,779 | 4/1977 | Hogan | 297/411 |
| 4,073,538 | 2/1978 | Hunter | 297/417 |
| 4,200,166 | 4/1980 | Hansen | 297/411 X |
| 4,425,863 | 1/1984 | Cutler | 297/423 X |

FOREIGN PATENT DOCUMENTS 3230166 2/1984 Fed. Rep. of Germany ... 297/DIG. 1

OTHER PUBLICATIONS

FIG. 6 (Prior Art), application S/N 07/706634, Robert Stidd, filing date May 29, 1991.

Primary Examiner—Kenneth J. Dorner
Assistant Examiner—Milton Nelson, Jr.
Attorney, Agent, or Firm—Alfred M. Walker

[57] ABSTRACT

A boat captain's helm chair has a seat part which is movable forwardly and rearwardly relative to a support, and a backrest with a retaining member such that its forward movement is counteracted. The forward portion of the seat part is rounded relative to the remaining portion to provide a support for the user in both a sitting and semi-standing rearward leaning postural position. Side portions of the seat extend forwardly of its mid portion to prevent lateral movements of the user. A compressive distortion of the armrest is counteracted by a dense U-shaped shock absorber to prevent the distortion of the armrest from constant use.

3 Claims, 4 Drawing Sheets

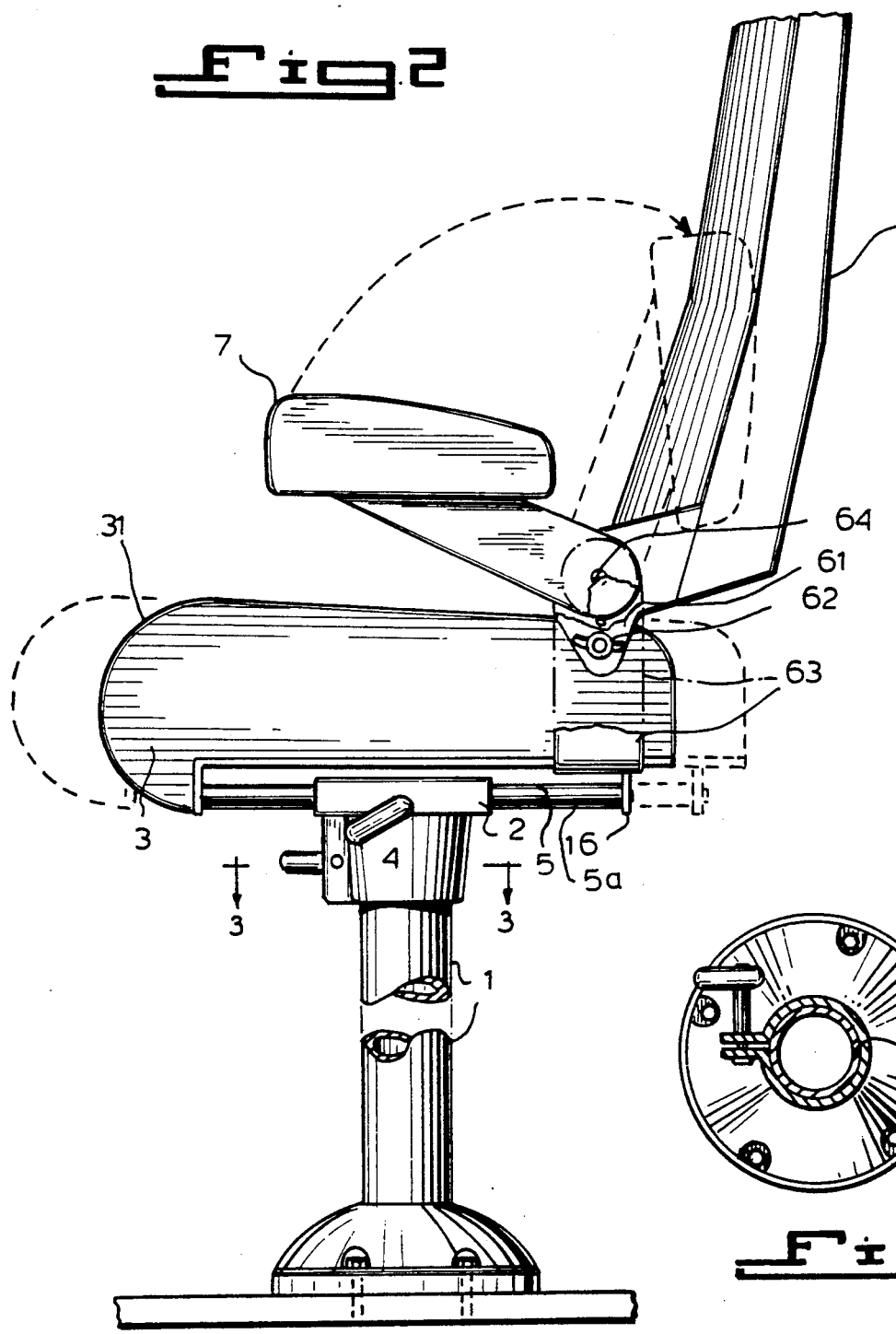

(USER CENTERED WITH WHEEL)

(PRIOR ART ARMREST AFTER PROLONGED USE)

HELM CHAIR

BACKGROUND OF THE INVENTION

The present invention relates to a boat captain's helm chair or in other words to chairs designed especially for boat captains.

Boat chairs are generally known in the art. They are made of various materials and have various designs. The chair especially for boat captains piloting a boat requires certain adjustments for a user both during a preparatory stage and during the very process of piloting when a boat captain interacts with the steering wheel of the boat. It is therefore desirable to improve the existing chairs.

SUMMARY OF THE INVENTION

Accordingly, it is an object of the present invention to provide a boat captain's helm chair which is an improvement over the existing chairs.

More particularly, it is an object of the present invention to provide a helm chair which is comfortable for a boat captain piloting a boat and permits adjustments before and during the process of piloting a boat.

It is a further object of the present invention to provide a helm chair with arm rests which maintain their structural integrity under constant use conditions.

It is a further object of the present invention to provide a helm chair which snugly holds a boat captain during variable and unstable boat motions.

It is a further object of the invention to provide a helm chair which permits a boat captain to easily change from a sitting position to a standing position and vice versa.

In keeping with these objects and with others which will become apparent hereinafter, one feature of the present invention resides, briefly stated, in a helm chair which has a stationary support, a seat part movable forwardly and rearwardly relative to the stationary support, a pair of arm rests which contain a flexible dense structural base designed to resist wearing at the top edges of the arm rests, a fastener subapparatus for resisting the movement of the seat part relative to the support in a forward direction, an edge to the seat part which permits a rearward leaning against the edge, and forward extensions on the forward portions of the sides of the seat.

When the helm chair is designed in accordance with the present invention, the seat part can be adjusted depending on whether a fisherman is tall or short. Also, the arm rests rotate upward, to permit easy sidewards dismounting from the chair.

In accordance with another feature of the invention, there is provided a pair of arm rests which contain a flexibly dense structural base for resisting wear and tear at the top edges of the arm rests.

In accordance with another feature of the present invention, the seat part has a rounded forward portion so as to provide a support for the user in a semi-standing, rearward leaning position, and therefore to contribute further to the comfort of the user. This permits the user to quickly adapt back and forth from a sitting position to a semi-standing, rearward leaning position.

Still a further feature of the present invention is that a backrest of the inventive chair has side supports for a user. When the side supports are provided on the backrest, lateral movements of a seated fisherman are prevented.

A still further feature of the present invention resides in that the edge of the seat has forward extending wing portion, the inner edges of which converge inward to prevent the lateral movement of the user's thighs while the boat is in motion.

In accordance with still another feature of the present invention, the backrest of the chair is provided with a fastener subapparatus arranged so that it resists backward tilting of the backrest. When the boat moves abruptly, the captain's body suddenly moves back and in particular so that the backrest is subjected to a sudden tilting force backwards. The accessory fastener subapparatus connected with the backrest at least partially counteracts this tilting force and retains the chair in its normal position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a side view of the helm chair of FIG. 1, showing in dotted lines the relative forward and rearward positions of the seat and the relative upper position of the arm rest.

FIG. 3 is a top view in partial section along line 3—3 of FIG. 2.

DESCRIPTION OF THE PREFERRED EMBODIMENT

Figure 1:
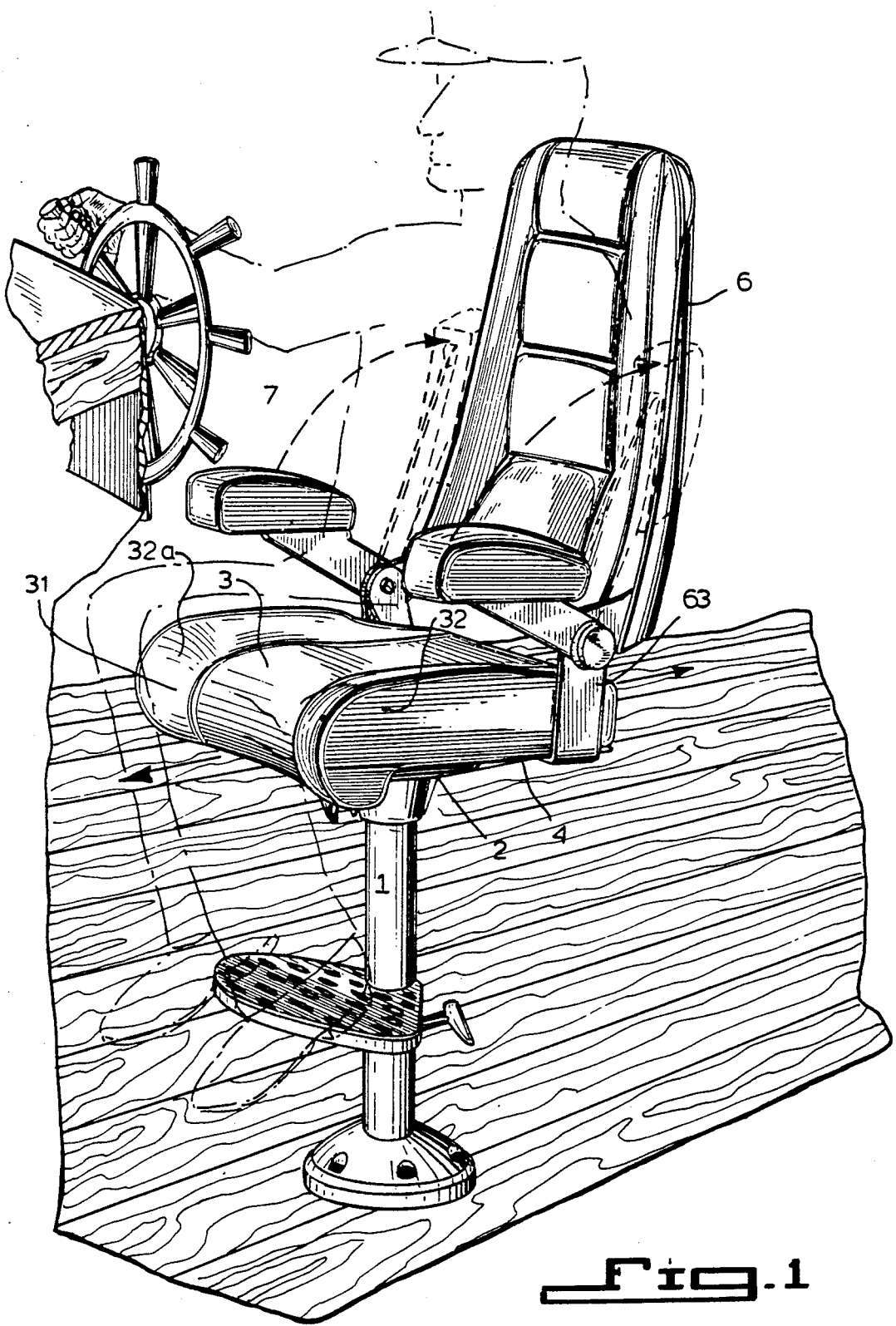
FIG. 1 is a perspective view of the helm chair in accordance with the present invention, showing the user in dotted lines.
Figure 2A:
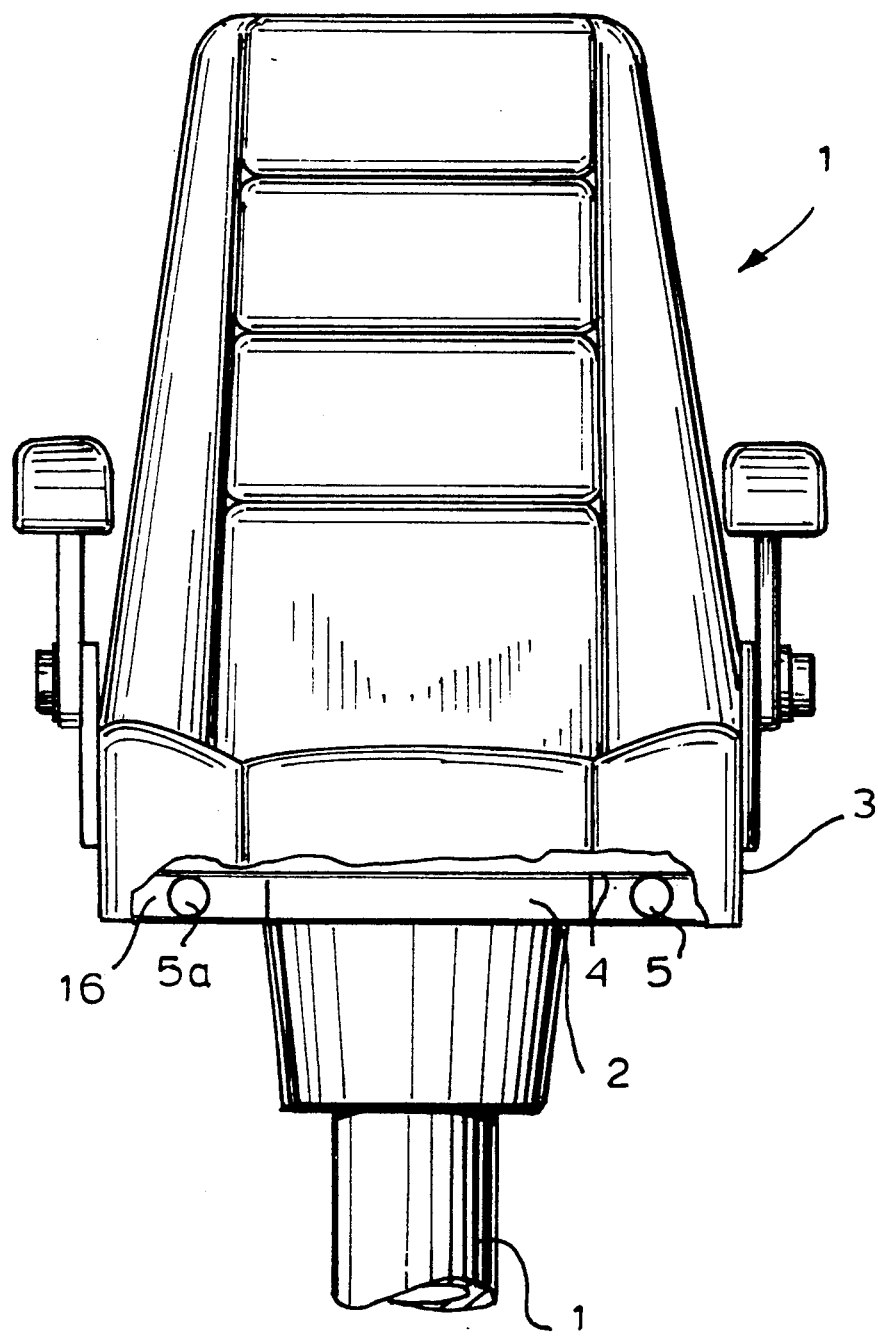
FIG. 2A is a rear view of the helm chair as in FIG. 1.

As shown in FIGS. 1 and 2 a helm chair according to the present invention has a pedestal which is identified as a whole with reference numeral 1 and is provided with a fixed chassis 2. A seat part 3 of the chair has a seat plate 4 on its lower surface and is fixedly connected with a pair of guiding rods 5 and 5a, for example by brackets 16. The seat part 3 is mounted on the chassis 2 so that it is movable forwardly and rearwardly relative to the pedestal. For this purpose, guiding rods 5 and 5a are arranged to move through the chassis 2 of the seat 3. The chassis 2 is provided with throughgoing openings for passing the guiding rods 5 and 5a therethrough.

The chair is provided with means for resisting the forward movement of the backrest part 6 relative to the seat 3. The resisting means can include an extension bracket identified with reference numeral 61 with a removable fastener 62. The bracket 61 is fixedly connected at one end to the support member 63 and the other end fixedly connected with the back part 6. Normally the backrest part 6 will rotate about axle 64 connected to extension bracket 61 and support member 63. The placement of fastener 62 prevents the rotation of backrest part 6 about axle 64 during turbulent sea conditions. During movement of the boat, when the waves apply a rocking force to a user in a forward or sideways direction, the user together with the back part 6 moves forward and backward, and this movement is counteracted by the locking action of seat part 6 by virtue of fastener 62, which absorbs the pulling force and brakes the forward and backward movements.

Figure 4:
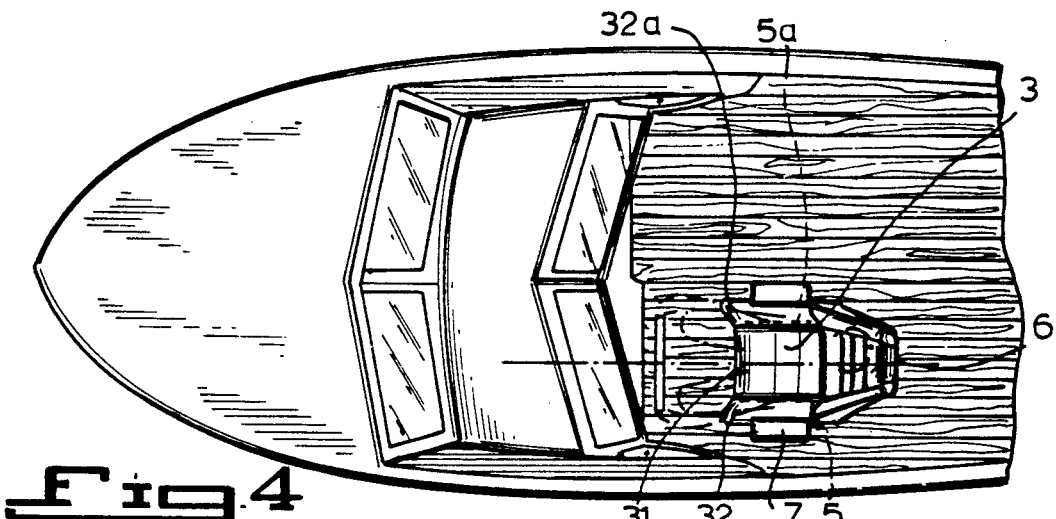
FIG. 4 is a top view of the helm chair as shown in FIG. 1 showing details of the connection of the helm chair to the boat.
Figure 5:
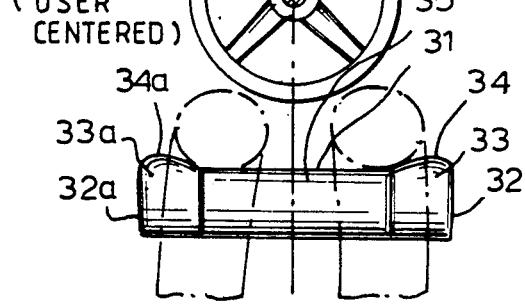
FIG. 5 is a top plan view of the forward edge of the seat of the chair as shown in FIG. 1, showing the thighs and knees of the user in dotted lines.

As shown in FIGS. 2, 4 and 5, another important feature of the present invention is a specific design of the seat part itself. As can be seen from the drawings, the seat part 3 has a front portion 31 which is rounded with respect to a remaining portion 32 of the seat part 3. The rounded front portion 31 of the seat part 3 permits the user to rapidly adjust from a sitting position to a semi-standing, rearward leaning position, which is also important during the process of piloting a boat.

The armrest 7 is tiltable relative to the seat part forwardly and rearwardly. The tilting is performed by turning the armrest 7 relative to the vertical projection brackets 61 of the back rest 6 about a horizontal transverse axis. The horizontal transverse axis is defined by a hinge unit which is identified as a whole by reference numeral 64.

As shown in FIGS. 4 and 5, the forward portion 31 of seat 3, when viewed from above, contains side portions 32 and 32a which have longitudinally extending wing sections 33 and 33a, which snuggly hold the outer parts of the legs of the user in place during turbulent rocking of the boat. The front surfaces 34 and 34a of wing sections 33 and 33a converge inward toward the center portion 35 of seat 3, which center portion has rounded edge 31 as noted hereinbefore. The wings also hold the legs in place when the user is in a semi-standing, rearward leaning position.

As shown in FIG. 2 the armrests 7 are movable upward and downward about axle 64 to permit easy mounting and dismounting of the user from the helm chair.

Figure 6:
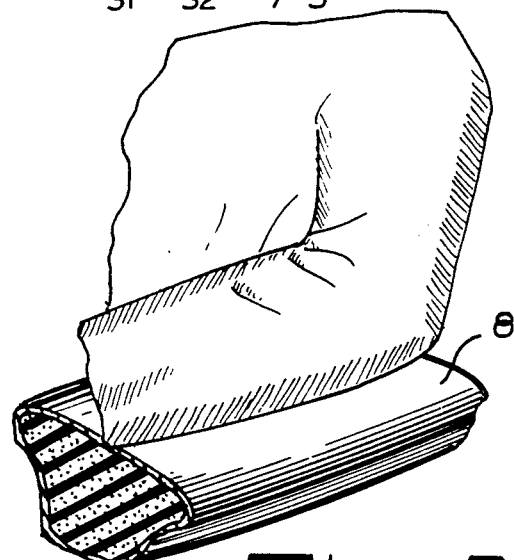
FIG. 6 is a close-up perspective view in partial section of one of the prior art arm rests, showing compressive wear and tear of the prior art arm rest.
Figure 7:
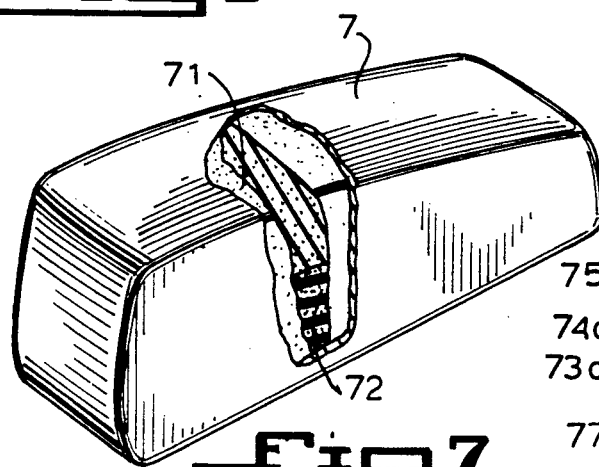
FIG. 7 is a close-up perspective view of the arm rest of the chair a in FIG. 1 in partial section.
Figure 8:
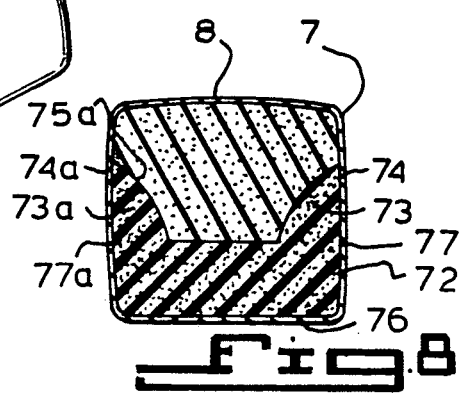
FIG. 8 is a front elevational view in section of the arm rest of the chair as shown in FIG. 1, in accordance with the present invention.

As shown in FIG. 6, the upper surface of a prior art armrest 8 often is compressed outward out of shape, by the constant pushing down of force upon the upper surface of prior art armrest 8. In order to solve the problem of the distortion of an armrest, the invention provides at least one dense base shock absorber 72 arranged between the upper part 71 of armrest 7 and the base 76 of armrest 7. Each side end 73 and 73a of the dense shock absorber 72 extends upward from the main portion 76 of shock absorber 72 with its side end portion 73 and 73a, and tapers off along tapered surface 75 and 75a of side end portions 73 and 73a to where the side surfaces 77 and 77a of each armrest 7 are. The dense base shock absorber 72 counteracts the outward compressive distortion effects of the user's arm upon armrest 7. The constant downward pressure of a helm chair user tends to push downwards onto the armrest 7, so the dense base shock absorber 72 counteracts the distortion by providing dense side end portions 73 and 73a to partially absorb the distortion thus helping the armrest to retain its initial support shape.

The helm chair in accordance with the present invention is also provided with other elements which are conventional for chairs and therefore are not described in detail.

The invention is not limited to the details shown, since various modifications and structural changes are possible without departing in any way from the spirit of the present invention.

What is desired to be protected by Letters Patent is set forth in particular in the appended claims.

I claim:

1. A boat captain's helm chair, comprising a stationary upright support adapted for securement to a suitable deck; an adjustably positioned mounting bracket releasably secured to said upright support to provide for vertical seat adjustment; a seat frame chassis having parallel rods secured thereto between a front and a back of said seat frame chassis; the mounting bracket releasably secured to said parallel rods to adjustably secure said seat frame chassis horizontally in relation to said mounting bracket; a seat cushion secured to said seat frame chassis, a seat frame bracket extending upwardly from said seat frame chassis on each side of said seat cushion; a back support chassis having opposing back support brackets extending from a lower portion of said back support's chassis, with a means to releasably secure said back support chassis to said seat frame bracket at a selected angular position in relation to said seat female member; a back support cushion secured to said back support chassis, said back support cushion having inwardly tapered opposing side wing portions; opposing armrests each secured to an arm rest bracket, search said arm rest bracket extending from an arm rest frame for pivotal mounting to said respective back support brackets to selectively, adjustably position said armrests between a first, generally lowered, extended position and a second, generally raised position in relation to said back support chassis; said opposing armrests each having a dense base shock absorber element with opposing sides of said shock absorber element tapering outward and upward towards the sides of each said armrest, with a less dense upper portion extending between said outward and upward opposing sides of said shock absorber element.

2. The helm chair as defined in claim 1, wherein a footrest is adjustably secured to the stationary upright support at a selected location beneath the seat mounting bracket.

3. The helm chair as defined in claim 1, wherein a means to counteract outward compressive distortion of said armrest is provided, said means comprising said sense base shock absorber element being tapered outward and upward towards said sides of each said armrest with said less dense portion extending between said outward and upward opposing sides of said shock absorber element, such that said less dense upper portion is cradled within and above said outer dense portion.

* * * * *